United States Patent [19]

Barker

[11] 3,973,641
[45] Aug. 10, 1976

[54] ANTI-THEFT DEVICE FOR MOTOR VEHICLES

[76] Inventor: Leslie C. Barker, 2659 E. 75th St., Chicago, Ill. 60649

[22] Filed: Apr. 25, 1975

[21] Appl. No.: 571,583

[52] U.S. Cl. .............................. 180/114; 200/45; 307/10 AT; 340/64
[51] Int. Cl.² .................................... B60R 25/04
[58] Field of Search ..................... 180/114; 340/64; 307/10 AT; 200/42 R, 44, 45

[56] References Cited
UNITED STATES PATENTS

| | | | |
|---|---|---|---|
| 2,140,812 | 12/1938 | Ratti | 180/114 X |
| 3,639,897 | 2/1972 | Teich | 340/64 |
| 3,714,628 | 1/1973 | Sloger | 340/64 |
| 3,876,884 | 4/1975 | Housman | 307/10 AT |
| 3,902,075 | 8/1975 | Oros | 180/114 X |

Primary Examiner—M. H. Wood, Jr.
Assistant Examiner—Terrance L. Siemens
Attorney, Agent, or Firm—Michael G. Berkman

[57] ABSTRACT

An anti-theft, electrical connection scrambler consisting of an adapter to be interposed between the distributor terminals and the spark plugs of an internal combustion engine. In use, the scrambler establishes open ignition circuits which cannot be operatively closed without knowledge of a predetermined code. Accordingly, only authorized personnel, who are in possession of the code, can start the engine.

4 Claims, 2 Drawing Figures

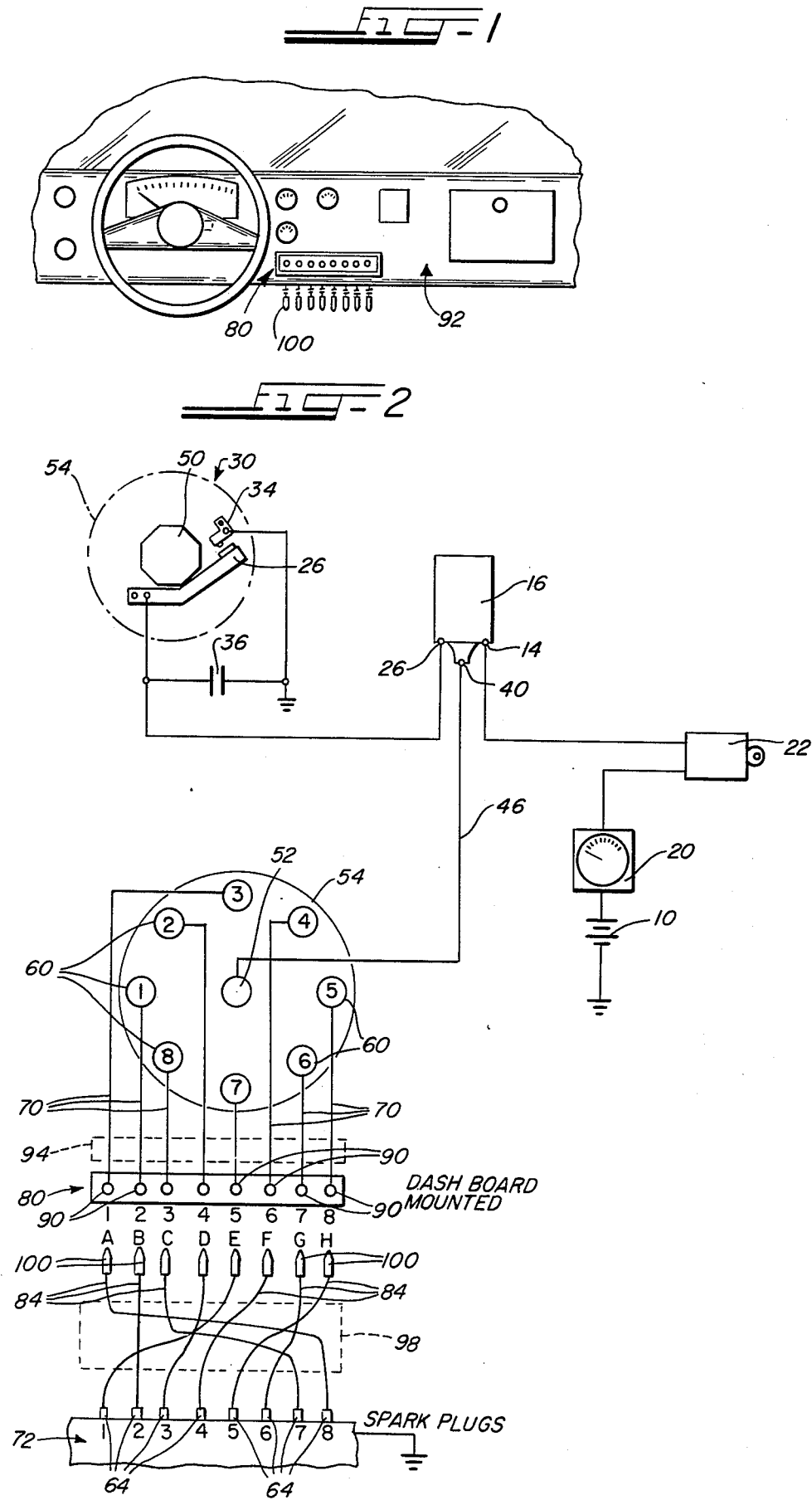

ANTI-THEFT DEVICE FOR MOTOR VEHICLES

BACKGROUND OF THE INVENTION

The present invention relates generally to an apparatus and method to prevent theft of motor vehicles and the like. More particularly, the invention is directed to a motor vehicle ignition security system effective to deter unauthorized starting and use of a vehicle. The problem of preventing automobile theft is one which has long challenged society, and many different systems and devices have been devised in an effort to reduce the incidence of such theft. Approaches have been varied and imaginative but, for the most part, equipment developed has been too complex and costly for general adoption.

One technique has been to install audio alarm systems. Another is the use of coded switches operating in conjunction with lock-out relays. Various types of "anti-theft" ignition system arrangements have been proposed. In still other mechanisms push button coding or combination switching arrangements have been utilized. More recently, the adoption of coded cards as ignition energization means has been urged. In spite of a compelling urgency and notwithstanding the extensive research and developmental work which has been carried out in this area, no completely satisfactory "system" or apparatus has heretofore been developed. Each approach has had objectionable features such as impractability, undue complexity, exorbitant cost, or dubious reliability. It is, accordingly, the aim of the present invention to provide a simple, low cost, yet extremely reliable vehicle ignition security apparatus which may be readily and conveniently installed, even by the vehicle owner.

SUMMARY OF THE INVENTION

The present invention invokes and effectively utilizes the basic engineering principle that in order to start and effectively to operate a motor vehicle of the internal combustion type one must satisfy a predetermined firing order for the fuel-igniting spark plugs. The firing order itself is correlated with the particular arrangement of the connections between the distributor and the spark plug electrodes. Since only one "correct" firing order exists for a particular engine, any material deviation from this order results in a condition in which the engine is, for all practical purposes, inoperative. In essentially all such cases it is impossible even to start the motor.

It is a principal feature of the invention that there is provided a simple yet highly effective electrical adaptor which constitutes a connection-scrambling device, interposed into the engine ignition system. The device serves as an effective impediment to unauthorized starting and use of the vehicle, irrespective of ignition switch actuation.

It is an important object of the invention to provide a readily installable, simple, yet highly effective adaptor interposed in the ignition system of an internal combustion vehicle, between the spark plugs and the distributor, so that only an operator who knows the proper connection code can complete the circuit correctly, and can energize the ignition system and start the motor.

Yet another feature of the invention is that no extensive modification of the electrical wiring system is required. One need only interpose a special assembly between the spark-plugs and the distributor terminals of an ignition circuit.

An inherent feature which constitutes an important advantage of the apparatus of the invention is that it is fully effective and not to be circumvented irrespective of the use of a "jumpering" wire as an ignition switch by-pass.

In effect, the apparatus of the invention provides an initial condition in which the ignition circuit is electrically "open" the condition can be remedied only by bridging the open connections through a unique, coded, connecting adaptor in which the connections must correspond precisely with the particular physical and electrical configuration in the distributor and in the spark plug array.

It is a feature of the present invention that there is no direct connection between the terminals of the distributor and each spark plug. Rather, the invention interposes a series adaptor and, in order to effect the proper electrical circuitry between each distributor terminal and the appropriate spark plug, it is essential that the "operator" make precisely correct pair-by-pair connections between a bank of plugs and cooperating jacks conveniently located in the car adjacent the dash board.

It is an important object of the invention to provide a simple apparatus which is effective and reliable as a "scrambler" of the inter-electrical connections between the distributor and the spark plugs in an internal combustion engine, the coding being known only to authorized personnel, who accordingly, are the only ones able to start the motor.

It is a general object of the invention to provide an improved, simple, yet highly effective theft-deterrent apparatus which may be quickly and conveniently installed in an automobile or similar vehicle with a minimum of disruption of standard ignition circuitry, and at relatively low cost.

BRIEF DESCRIPTION OF THE DRAWING

Other and further objects and advantages of the invention will become apparent from a reading of the following specification taken in conjunction with the drawing in which:

FIG. 1 is a fragmentary view of the dash board of a car showing the adapter of the invention in place; and FIG. 2 is a diagrammatic illustration of an automobile ignition system and showing the manner in which the theft-deterrent adapter of the present invention is connected.

DESCRIPTION OF THE PREFERRED EMBODIMENT

For purposes of illustrative disclosure and not to be considered as limiting the invention in any way, in accordance with a preferred embodiment, the aims and objects are accomplished by providing, in a motor vehicle ignition system, an adapter which is interposed in series between the spark plugs and the distributor to provide a code-governed and code-dependent connector constituting an effective impediment to any unauthorized starting and use of the vehicle, irrespective of ignition switch actuation or "jumping". In its functional role, the adapter is a "scrambler" inserted electrically between the spark plugs and the distributor and including means for connecting and disconnecting the leads which provide firing voltages to the spark plugs. Since the proper functional interconnection between the disconnected leads and the adapter is in no sense evident upon merely viewing the components involved, the system is essentially "coded". Only authorized personnel will be able to complete the connections so as to establish an operative condition of the ignition system.

In a preferred embodiment of the invention the lead wires from the distributor are delivered through the fire wall of the engine compartment and terminate at the dashboard as an array of electrical sockets. Wire leads from the spark plugs also pass through the fire wall to the interior of the car adjacent the driver's position and terminate in probes adapted for connection into the sockets. Authorized knowledge of the "code" delineating which "plug" goes into which "socket" is an essential prerequisite to making the proper interconnections to establish an operative ignition system.

Referring now to the drawing, there is shown in FIG. 1, for purposes of illustration and not in any limiting sense, a schematic representation of an internal combustion engine ignition system of the type in which the subject invention finds utility. The conventional electrical ignition system components illustrated include a power supply or battery 10 connected to the primary 14 of a spark coil 16 having primary and secondary windings (not shown) through an ammeter 20 to an ignition switch 22. A second terminal 26 connects the primary of the spark coil 16 to one breaker point 26 of a distributor 30, the opposed breaker point 34 of the distributor 30 being grounded and coupled to the first breaker point 26 through a capacitor 36, in the conventional manner. A third terminal 40 of the spark coil 16 is connected by a line 46 to the distributor rotor 50 through the center tap 52 of the distributor cap 54. As the rotor 50 turns it establishes time-spaced, momentary, sequential electrically conductive paths between the output of the coil 16 and the several (8) distributor terminals 60 whereby high voltage impulses are delivered, in a particular sequence, to the spark plugs 64 of the engine through lead wires 70 to ignite the combustible mixture within the individual cylinders of the engine 72.

For purposes of illustrative disclosure, the engine 72 in connection with which the subject invention is explained is shown as including eight spark plugs 64 and, correspondingly, the distributor 30 as including eight terminals 60. For reference purposes, the terminals 60 of the distributor 30 have been assigned the numbers 1 through 8, in a clockwise direction, and the spark plugs have been numbered 1 through 8 from left to right, all as indicated in FIG. 2. In engines of the general type shown, the order in which the spark plugs are energized is not in a direct geometric sequence. That is, the engine has a particular "firing order". In the illustrative example, the firing order for the spark plugs is arbitrarily considered to be 1-3-5-8-7-6-4-2-, and such a firing order is achieved by making appropriate connections from the distributor terminals 60, which fire in sequence, to the spark plugs 64. The usual procedure is to make direct wire connections. However, in the instant invention this is not done.

A fundamental and essential concept of the present invention is the interpositioning, electrically, between the distributor 30 and the engine spark plugs 64 of an adaptor or "scrambler" 80 which is, functionally, a junction box for connecting the lead wires 70 from the distributor terminals 60 to lead wires 84 connected to the spark plugs 64. As shown, the adaptor or interconnector 80 includes an array of eight sockets 90 to each of which there is connected a lead line 70 from each of the distributor terminals 60. In the example shown, distributor terminals 1 through 8 are connected, respectively, to socket numbers 2,4,1,6,8,7,5,3 reading from left to right. This arrangement is purely arbitrary. Physically, the connector 80 is located within the driver's compartment, preferably on the dash board 92 so as to be readily accessible.

The lead conductors 70 which interconnect the terminals 60 of the distributor 30 with the sockets 90 of the connector 80 are encased in a tubular shield or sheath 94 (indicated schematically) which passes through the fire wall of the engine compartment. Accordingly, consistent with the purpose and aims of the invention, it is not possible visually to discern the "arrangement" of the distributor leads 70 merely by observing the lead ends as they appear at the connector 80. The lead wires 84 which are connected to the spark plugs 64 are encased in a second protective tube or sheath 98 which also passes through the fire wall of the engine compartment. The free ends of the lead wires 84 from the spark plugs 64 are each provided with a plug lead or probe 100 adapted for insertion into the sockets 90 in the connector 80. In the particular exemplary arrangement shown, the probes 100 have been arbitrarily marked with the letters A through H, in a random manner. In the wiring arrangement shown, the spark plugs 64, numbered 1-8, are connected respectively, to leads E,B,D,F,H,G,C,A. It will now be apparent how the "scrambling" is achieved.

Since, for a specific firing order of the particular engine shown, the spark plugs 64 must be connected to the distributor terminals 60 in a predetermined order, the necessary connections can be made only by insertion of the correct spark-plug-connected probes 100 into the appropriate sockets 90. That is, in order to ensure a firing order of 1-3-5-8-7-6-4-2, the connection arrangement of the probes 100 into the sockets 80 must be, for the wiring indicated, E-D-H-A-C-G-F-B, from left to right. Since, as previously described, it is not possible visually to trace the wires extending from the spark plugs 64 into the driving compartment, one must know the "code" of the system in order to make the appropriate electrical connections.

In view of the foregoing detailed description, the mode in which the invention is used will be readily understood. In the "standby" condition of the apparatus, the probes 100 are disconnected from the sockets 90. In order to start the motor, it is necessary merely to insert the plug leads 100 into the sockets 90, in the correct arrangement. Then, and only then, will it be possible to fire the engine through the usual energization of the ignition system. Incorrect connections will result in ignition system malfunction and will prevent engine starting. When the vehicle is left and is to be locked, the operator will not only turn off and remove the ignition key, but will, in addition, withdraw all of the probes 100 from the sockets 90.

The invention provides a simple, relatively inexpensive, and highly effective theft deterrent ignition system in which the motor may be energized only by persons having the correct code information as to the interconnections. It will be appreciated that purely random experimentation or guesswork by one not authorized to operate the vehicle will result in failure to achieve an operable pattern, the permutations and combinations of two sets of 8 taken two at a time being exceedingly numerous. Casual solution of the problem posed is most impractical and highly improbable.

While a specific preferred embodiment of the invention has been illustrated, those skilled in the art will appreciate that other arrangements and modifications are feasible. Accordingly, the claims are not to be limited to the specific details illustrated and described but are intended to cover all modifications within the spirit and scope of the invention.

What is claimed is:

1. In a motor vehicle ignition system including a voltage source, an ignition switch, spark plugs, a distributor, and conductive leads operatively connecting the same in a motor-starting circuit, a theft-deterrent security assembly obviating any need physical to remove from the vehicle any vehicle ignition system component thereof so as to prevent theft of the vehicle, said theft deterrent security assembly constituting a connection-scrambling device for interposition, electrically, between said spark plugs and said distributor to provide code-governed and code-dependent connector means constituting an effective impediment to any unauthorized starting and use of the vehicle, irrespective of ignition switch actuation, said connection-scrambling device comprising a first array and a second array of interrelated coded connectors, each array having the same number of functional terminal contacts for pairing, manually, in a one-to-one relationship, first electrical leads interconnecting each of said contacts of said first array with a corresponding electrical terminal of said distributor, second electrical leads interconnecting each of said contacts of said second array with a corresponding one of said spark plugs at an electrode thereof, contacting means for establishing electrical continuity between each of a given one of said coded connectors of said first array with each of a given one of said coded connectors of said second array, code designation and identification means to ensure that connections between connectors of said first array and connectors of said second array are made only in a predetermined, unique, one-to-one pattern, which pattern alone establishes an operative ignition circuit, all elements of said assembly remaining at all times in the vehicle.

2. The apparatus as set forth in claim 1 wherein said first array of connectors comprises a series of electrical sockets joined conductively to terminals of said distributor, and wherein said second array of connectors comprises a series of probes, said probes adapted to couple conductively with said sockets to provide electrical connections and continuity between said distributor and said spark plugs.

3. The apparatus as set forth in claim 1 and further comprising first conduit means and second conduit means enveloping respectively said first electrical leads and said second electrical leads as protective and visually masking sheaths to preclude visual tracing of electrical circuitry between said distributor and said spark plugs.

4. The apparatus as set forth in claim 2 wherein each socket of said series of electrical sockets is fixed in place and at hand for ready access by an operator of the vehicle in which said theft-deterrent security assembly is installed, and wherein each one of said series of probes is movably supported adjacent to but out of contact with the sockets so as to obviate any indication as to which probe is to be inserted into which socket to provide an operative ignition system.

* * * * *